United States Patent
Roche

(10) Patent No.: US 12,333,245 B2
(45) Date of Patent: **\*Jun. 17, 2025**

(54) METHODS AND APPARATUS TO IMPROVE DISAMBIGUATION AND INTERPRETATION IN AUTOMATED TEXT ANALYSIS USING STRUCTURED LANGUAGE SPACE AND TRANSDUCERS APPLIED ON AUTOMATONS

(71) Applicant: Clover.AI, LLC, Belmont, MA (US)

(72) Inventor: Emmanuel Roche, Belmont, MA (US)

(73) Assignee: Clover.AI, LLC, Belmont, MA (US)

( \* ) Notice: Subject to any disclaimer, the term of this patent is extended or adjusted under 35 U.S.C. 154(b) by 641 days.

This patent is subject to a terminal disclaimer.

(21) Appl. No.: 17/465,686

(22) Filed: Sep. 2, 2021

(65) Prior Publication Data

US 2022/0004708 A1 Jan. 6, 2022

Related U.S. Application Data

(63) Continuation of application No. PCT/US2020/020842, filed on Mar. 3, 2020.

(60) Provisional application No. 62/813,540, filed on Mar. 4, 2019.

(51) Int. Cl.
*G06F 40/211* (2020.01)
*G06F 40/268* (2020.01)

(52) U.S. Cl.
CPC .......... *G06F 40/211* (2020.01); *G06F 40/268* (2020.01)

(58) Field of Classification Search
CPC ............................ G06F 40/211; G06F 40/268
See application file for complete search history.

(56) References Cited

U.S. PATENT DOCUMENTS

| | | | | |
|---|---|---|---|---|
| 5,610,812 A | \* | 3/1997 | Schabes | G06F 40/211 704/4 |
| 6,816,830 B1 | \* | 11/2004 | Kempe | G06F 40/216 704/9 |
| 8,700,404 B1 | | 4/2014 | Chotimongkol et al. | |

(Continued)

OTHER PUBLICATIONS

Allauzen et al., OpenFst: A General and Efficient Weighted Finite-State Transducer Library. International Conference on Implementation and Application of Automata. Jul. 2007. 12 pages.

(Continued)

*Primary Examiner* — Pierre Louis Desir
*Assistant Examiner* — Keisha Y. Castillo-Torres
(74) *Attorney, Agent, or Firm* — Smith Baluch LLP

(57) ABSTRACT

Methods and apparatus for automated processing of natural language text is described. Received text can be preprocessed to produce language-space data that includes descriptive data elements for words. Source code that includes linguistic constraints, and that may be written in a programming language that is user-friendly to linguists, can be compiled to produce finite-state transducers and bi-machine transducers that are used by a language-processing virtual machine to process the language-space data. The language-processing virtual machine selects and executes code segments in accordance with path transitions of the transducers when applied on automatons to disambiguate meanings of words in the received text.

16 Claims, 8 Drawing Sheets

(56) References Cited

U.S. PATENT DOCUMENTS

| | | | | |
|---|---|---|---|---|
| 8,788,258 | B1* | 7/2014 | Bangalore | G06F 40/58 704/7 |
| 9,928,040 | B2 | 3/2018 | Tarlow et al. | |
| 9,972,314 | B2 | 5/2018 | Wang et al. | |
| 10,936,825 | B1 | 3/2021 | Roche | |
| 2002/0123994 | A1* | 9/2002 | Schabes | G06F 16/30 707/999.005 |
| 2003/0046055 | A1* | 3/2003 | Kempe | G06F 40/232 704/E15.022 |
| 2004/0128122 | A1* | 7/2004 | Privault | G06F 40/289 704/4 |
| 2004/0236566 | A1* | 11/2004 | Simske | G06F 40/253 704/4 |
| 2008/0052644 | A1 | 2/2008 | Ashar et al. | |
| 2008/0122665 | A1 | 5/2008 | Paris | |
| 2016/0188573 | A1 | 6/2016 | Tang | |
| 2017/0352348 | A1* | 12/2017 | Wang | G10L 15/197 |
| 2021/0019476 | A1 | 1/2021 | Roche | |

OTHER PUBLICATIONS

Berstel, Transductions and Context-Free Languages. Vieweg+ Teubner Verlag. 1979. 6 pages. ISBN:978-3-663-09367-1.

Culotta et al., Confidence Estimation for Information Extraction. Proceedings of HLT-NAACL 2004: Short Papers. May 2004. 4 pages.

Eilenberg, Automata, Languages, and Machines. vol. A. Academic Press, New York and London. 1974. 4 pages.

Harris, A Theory of Language and Information. A Mathematical Approach. Clarendon Press, Oxford. 1991. 4 pages. ISBN: 978-0-19-824224-6.

International Search Report and Written Opinion in International Application No. PCT/US2020/020842 mailed Jun. 29, 2020, 17 pages.

Jochim et al., Named Entity Recognition in the Medical Domain with Constrained CRF Models. Proceedings of the 15th Conference of the European Chapter of the Association for Computational Linguistics: vol. 1, Long Papers. Apr. 2017. pp. 839-849.

Joshi et al., Tree-Adjoining Grammars. Handbook of Formal Languages. Springer-Verlag Berlin Heidelberg. 1997. 55 pages.

Karttunen, Constructing Lexical Transducers. The Proceedings of the 15th International Conference on Computational Linguistics. Aug. 1994. 6 pages.

Klein et al., Accurate Unlexicalized Parsing. Proceedings of the 41st Annual Meeting of the Association for Computational Linguistics. 2003. 8 pages.

Levy et al., Tregex and Tsurgeon: tools for querying and manipulating tree data structures. Proceedings of the Fifth International Conference on Language Resources and Evaluation. 2006. 4 pages.

Manning, Part-of-Speech Tagging from 97% to 100%: Is It Time for Some Linguistics? Computational Linguistics and Intelligent Text Processing. 2011. Lecture Notes in Computer Science. 19 pages.

Mohri, Minimization algorithms for sequential transducers. Theoretical Computer Science. 2000;234:177-201.

Roche et al. (ed), Finite-State Language Processing. Parsing with Finite-State Transducers. 1997. 22 pages.

Roche, Text Disambiguation by Finite State Automata, An Algorithm and Experiments in Corpora. Coling '92: Proceedings of the 14th conference on Computational Linguistics. Aug. 23, 1992;3:993-997.

Roche, Two Parsing Algorithms by Means of Finite State Transducers. Coling '94: Proceedings of the 15th conference on Computational Linguistics. Aug. 5, 1994;1:431-435.

Schutzenberger, A Remark on Finite Transducers. Information and Control. 1961;4:185-196.

Stanford Parser. Last updated Sep. 12, 2016. Accessed at http://nlp.stanford.edu:8080/parser/. 2 pages.

Suchanek et al., YAGO: A Core of Semantic Knowledge Unifying WordNet and Wikipedia. WWW 2007. Track: Semantic Web. p. 697-706.

Wang et al., Knowledge Graph and Text Jointly Embedding. Proceedings of the 2014 Conference on Empirical Methods in Natural Language Processing (EMNLP). 2014. 11 pages.

Zhou et al., Event extraction from Twitter using Non-Parametric Bayesian Mixture Model with Word Embeddings. Proceedings of the 15th Conference of the European Chapter of the Association for Computational Linguistics: vol. 1, Long Papers. Apr. 2017. pp. 808-817. 10 pages.

*MCRO, Inc. v. Bandai Namco Games America*, U.S. Court of Appeals for Federal Circuit, Decision dated Sep. 13, 2016, 27 pages.

* cited by examiner

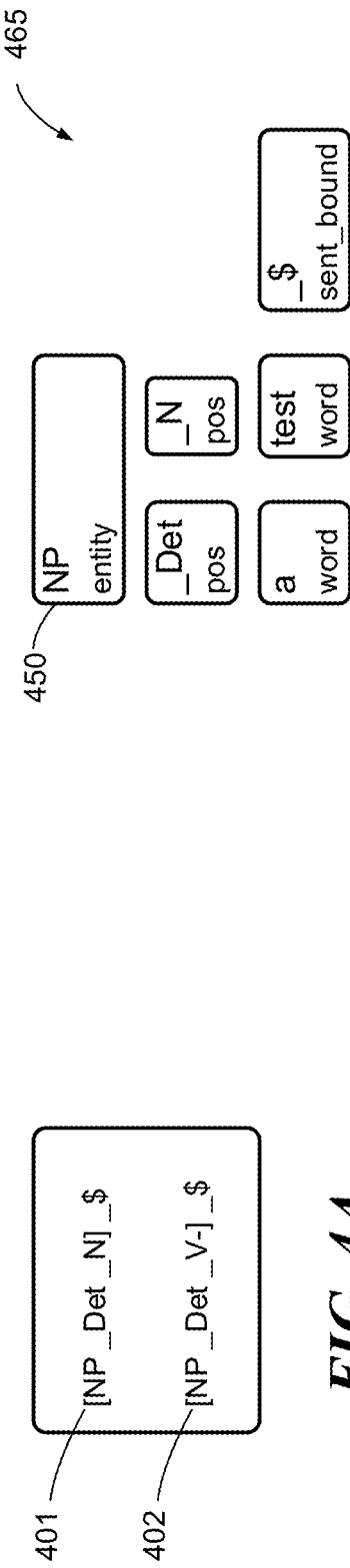
*FIG. 4A*
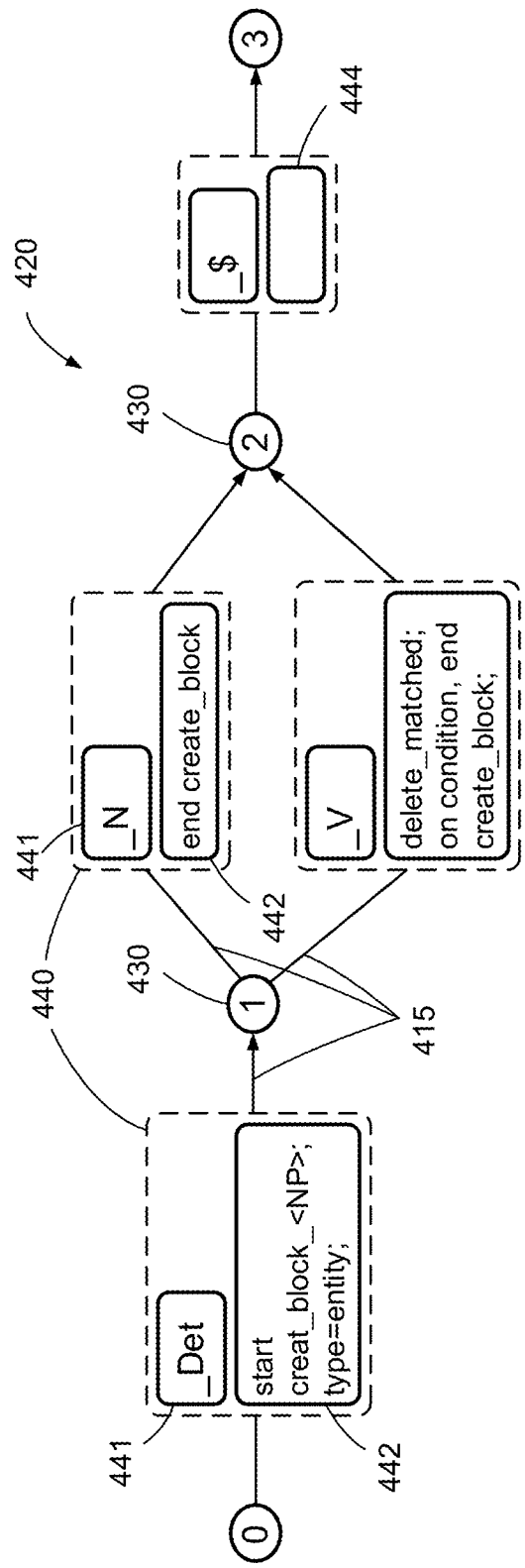
*FIG. 4B*
*FIG. 4C*

METHODS AND APPARATUS TO IMPROVE DISAMBIGUATION AND INTERPRETATION IN AUTOMATED TEXT ANALYSIS USING STRUCTURED LANGUAGE SPACE AND TRANSDUCERS APPLIED ON AUTOMATONS

RELATED APPLICATIONS

This Application is a continuation application of international application PCT/US2020/020842, titled "Methods and Apparatus to Improve Disambiguation and Interpretation in Automated Text Analysis Using Structured Language Space and Transducers Applied on Automatons," filed on Mar. 3, 2020, which application claims priority under 35 U.S.C. § 119(e) to U.S. Provisional Application Ser. No. 62/813,540, titled "Methods and Apparatus to Improve Disambiguation and Interpretation in Automated Text Analysis Using Structured Language Space and Transducers Applied on Automatons" filed Mar. 4, 2019. Both of the foregoing applications are herein incorporated by reference in their entirety.

FIELD

Described apparatus and methods relate to computer-implemented embodiments that improve the speed and accuracy with which natural language text, for example, can be processed and interpreted.

BACKGROUND

Natural language can be very challenging to process and obtain accurate representations using computer-implemented methods. An example natural language processor is the Stanford Parser that is available on-line at http://nlp.stanford.edu:8080/parser/. Difficulties can occur because some words can have many meanings, and a machine can err when determining which meaning of a plurality of meanings is a correct meaning to use in the context of text in which the words appear. Sentences that appear very obvious to any human reader can require computationally intensive algorithms for a machine to decipher correctly. If the natural language is not interpreted correctly by a language processor, then the ability to automatically search and/or extract meaningful and correct information from natural language text, for example, is compromised.

SUMMARY

The present invention relates to methods and apparatus that improve computer-implemented interpretation and representation of natural language. According to some implementations, source code for a language-processing virtual machine is provided such that constraints for language processing can be expressed more naturally in the source code by linguists. The source code can then be compiled to produce transducers that are utilized by the language-processing virtual machine to dynamically select and execute code segments while processing received text. The transducers, for example, are used to process language-space data structures that are derived from received text. The language-processing virtual machine can process the language-space data structures to disambiguate meanings of words, among other tasks, and output modified language-space data that includes disambiguated words that are in compliance with linguistic constraints. In some embodiments, the language-processing virtual machine can output information indicating the confidence with which sentences in the received text have been interpreted correctly.

Some embodiments relate to a method of automated text analysis, the method comprising: receiving text; parsing the received text to generate a language space in which one or more descriptive data elements are associated with each word in the received text; and executing an operation with a finite-state transducer or bi-machine transducer to process a sentence in the language space, wherein the operation comprises: identifying a match between a first identifying element in the finite-state transducer or bi-machine transducer and a first identifier of a first descriptive data element in the language space associated with a word in the sentence; selecting a first code segment that is identified in the finite-state transducer or bi-machine transducer to be associated with the first identifying element; and executing the first code segment to produce a modified language space in which the meaning of the word in the sentence associated with the first descriptive data element is disambiguated.

Some embodiments relate to a language-processing system comprising at least one processor programmed to implement a language-processing virtual machine that processes automatons produced from natural language sentences, wherein the automatons comprise sequences of linked descriptive data elements for words of a sentence; and a finite-state transducer that is applied on an automaton, wherein the finite-state transducer comprises a sequence of linked objects.

Some embodiments relate to computer-readable medium encoding instructions that, when executed by at least one processor, adapt the at least one processor to: receive text; preprocess the received text to generate a language space in which one or more descriptive data elements are associated with each word in the received text; and execute an operation with a finite-state transducer or bi-machine transducer to process a sentence in the language space, wherein the operation comprises: identifying a match between a first identifying element in the finite-state transducer or bi-machine transducer and a first identifier of a first descriptive data element in the language space associated with a word in the sentence; selecting a first code segment that is identified in the finite-state transducer or bi-machine transducer to be associated with the first identifying element; and executing the first code segment to produce a modified language space in which the meaning of the word in the sentence associated with the first descriptive data element is disambiguated.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 4A illustrates example source code that may be compiled for a language-processing virtual machine, according to some embodiments.

FIG. 4B depicts example pseudo-code binary objects for a finite-state transducer, according to some embodiments.

FIG. 4C depicts an example of a modified language space.

The features and advantages of the present invention will become more apparent from the detailed description set forth below when taken in conjunction with the drawings.

DETAILED DESCRIPTION

Figure 1:
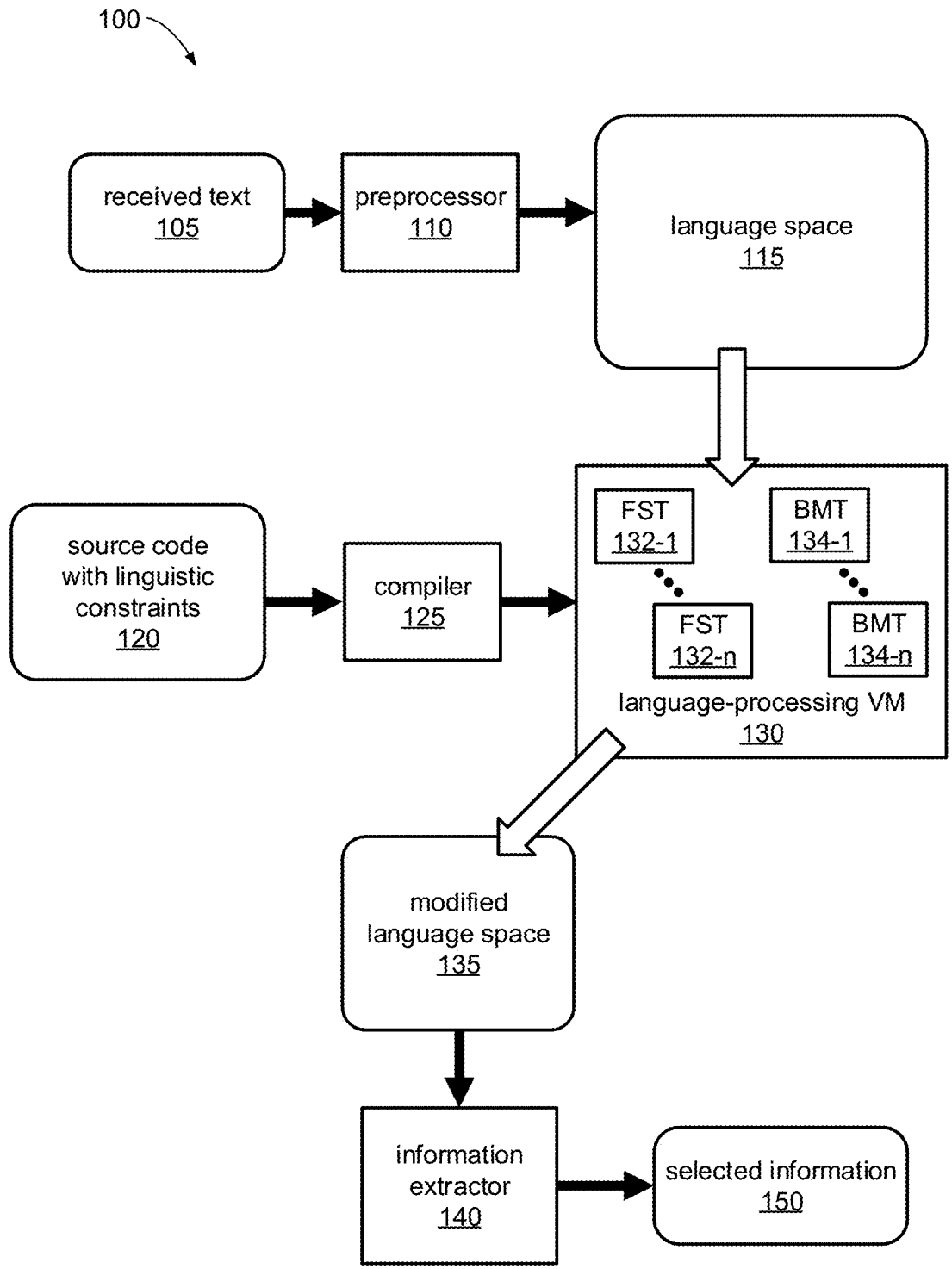
FIG. 1 is a block-diagram representation of a language-processing system, according to some embodiments.

In overview, FIG. 1 illustrates an example of a language-processing system 100, according to the present embodiments. A language-processing system 100 may include a preprocessor 110 and language-processing virtual machine 130, in some embodiments. In some cases, a language-processing system 100 may further include a compiler 125 and an information extractor 140. A language-processing system 100 may be configured to receive and process natural language text 105, for example, and produce modified language-space data 135 that is representative of the natural language text and includes words for which meanings have been disambiguated. By using transducers to process data structures derived from the received text 105, the language-processing virtual machine 130 can process large bodies of text with lengthy sentences significantly faster than conventional approaches to natural language processing. The modified language-space data 135 may include further information, added by the virtual machine 130, that improves the accuracy of automated queried search results, for example, when extracting information from the received text.

Preprocessor 110 may receive text 105 to be analyzed. In some cases, the received text 105 is natural language text (e.g., descriptive text relating to one or more subjects, a transcription of a news broadcast, a transcription of a speech, text from a publication, etc.). In some implementations, the received text 105 may comprise multiple documents that are to be analyzed (e.g., multiple reports from an institution, multiple records from an on-line source, such as all text for Wikipedia pages, multiple publications relating to a particular subject of interest, etc.) The received text 105 may be produced by any suitable method including automated speech recognition. The received text 105 may be input to preprocessor 110 from one or more data files, typed in directly, or retrieved from an on-line source or sources, for example. Preprocessor 110 may preprocess the received text 105 and generate language-space data 115, which is described in further detail below.

A preprocessor 110 may be implemented as code adapting and executing on at least one processor. In some implementations, a preprocessor may be implemented as at least one application-specific integrated circuit (ASIC) and/or field-programmable gate array (FPGA) configured to carry out preprocessing tasks on the received text 105. In some cases, a preprocessor 110 may be implemented as a combination of code and firmware configured to carry out preprocessing tasks, such as dictionary look-ups and lemmatization for received words.

A language-processing virtual machine 130 may process the language-space data 115, as indicated in FIG. 1, and output modified language-space data 135 in which meanings of words in the received text 105 have been disambiguated. When processing the language-space data 115, the language-processing virtual machine 130 may use finite-state transducers 132-1, . . . 132-$n$ and/or bi-machine transducers 134-1, . . . 134-$n$ to, among other tasks, disambiguate word meanings and produce the modified language-space data 135. According to some embodiments, the finite-state transducers 132-1, . . . 132-$n$ and bi-machine transducers 134-1, . . . 134-$n$ operate to dynamically select and cause execution of code that is dependent upon path traversals within the language-space virtual machine, as described in more detail below.

A language-processing virtual machine 130 may be implemented as code adapting and executing on at least one processor. In some implementations, a language-processing virtual machine may be implemented as at least one application-specific integrated circuit (ASIC) and/or field-programmable gate array (FPGA) configured to carry out processing tasks (e.g., word disambiguation tasks described in more detail below) for received language-space data 115. In some cases, a language-processing virtual machine 130 may be implemented as a combination of code and firmware configured to carry out processing tasks.

According to some implementations, the finite-state transducers 132-1, . . . 132-$n$ and/or bi-machine transducers 134-1, . . . 134-$n$ may be generated by a compiler 125 from source code 120 that expresses linguistic constraints. The inventor has recognized and appreciated that conventional approaches to natural language processing adapt existing programming languages (e.g., C, Fortran, etc.) to the tasks of natural language processing. This approach can make it difficult for someone with an expertise in linguistics to develop code for natural language processing. In such cases, linguists may work in collaboration with computer programming experts to develop suitable code for natural language processing.

According to some present embodiments, source code 120 can be a new or specialized code that includes instructions that are more user-friendly for a linguistic expert. Example instructions are described in connection with FIG. 4A. A compiler 125, which may also be specialized for the source code 120 can compile lines of source code into executable code and objects that are used by the language-processing virtual machine 130. For example, a compiler 125 may compile source code into one or more finite state transducers and/or one or more bi-machine transducers. A compiler 125 may comprise specialized code that adapts and executes on at least one processor.

A language-processing system 100 may also include an information extractor 140. An information extractor 140 may be implemented as code adapting and executing on at least one processor. In some implementations, an information extractor 140 may be implemented as at least one ASIC or FPGA configured to carry out information location and/or extraction tasks. In some cases, an information extractor 140 may be implemented as a combination of code and firmware configured to carry out information location and/or extraction tasks. An information extractor 140 may be adapted to identify words and/or entities in modified language-space data 135 based on search criterion, for example, and output selected information 150 for review by a user, storage in memory, or for further automated processing. The information extractor 140 may be configured to receive structured search queries entered by a user. In some implementations, the selected information 150 is output to one or more data files or one or more displays.

Figure 2A:
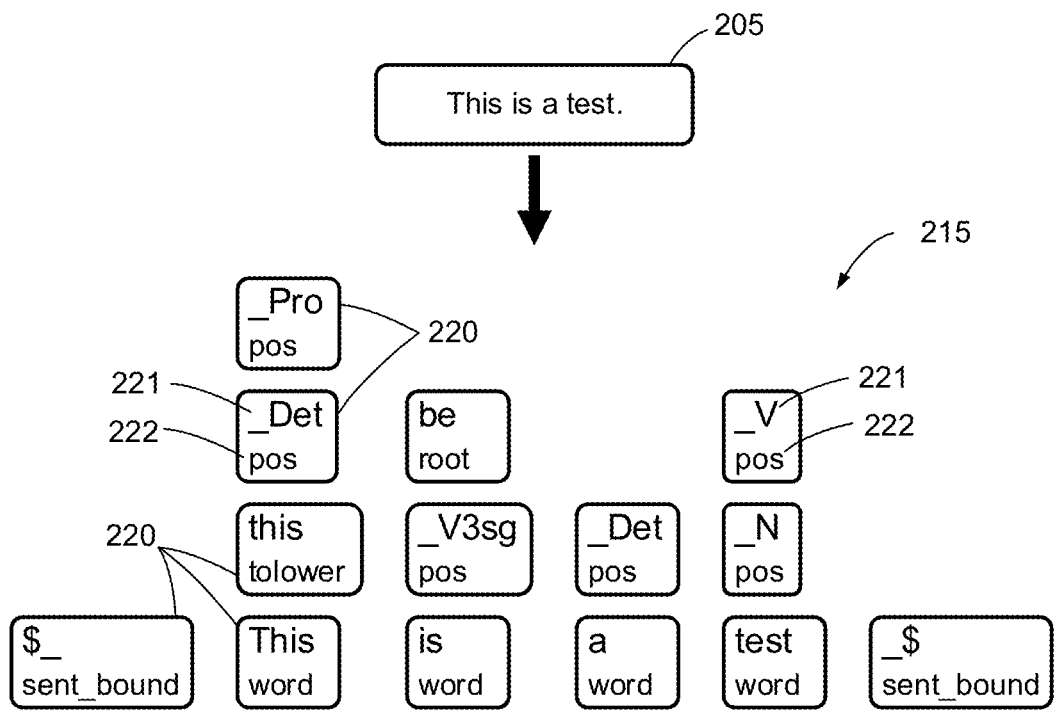
FIG. 2A depicts an example of language-space data, according to some embodiments.

A simplified example of received text 205 is illustrated in FIG. 2A along with a depiction of corresponding language-space data 215 for the received text 205. In this example, the received text is a single sentence having four words. The language-space data for the sentence may be generated by a preprocessor 110 from the received text 205. In some embodiments, received text can include many sentences, paragraphs, pages, chapters, sections, documents, etc. of text.

In this simplified example, the received text is preprocessed into a plurality of descriptive data elements 220 illustrated as data blocks in FIG. 2A. The preprocessor 110 may be configured to tokenize the received text (e.g., split a sentence into a sequence of individual words and construct descriptive data elements 220 for each word). In some implementations, the preprocessor may perform a dictionary look-up to find potential parts of speech for each word and/or other features for each word, such as possible meanings, roots, variations in spelling, translations, etc. In some implementations, a preprocessor 110 may perform lemmatization of words.

One or more descriptive data elements 220 may be associated with each word of the received text 205 and provide further information about potential uses of the word. For example, the word "This" of received text 205 has three descriptive elements 220 associated with it (illustrated in a vertical column in FIG. 2A). In a database, descriptive data elements 220 may be associated with a word of received text using common tags, pointers, or using a relational database structure, for example. There may be additional descriptive elements such as bounding descriptive elements that are used to represent beginning and ends of sentences (e.g., illustrated in FIG. 2A as a descriptive element containing the character sequence "$_" and "_$"), paragraphs, sections, etc. In some implementations, there may be punctuation descriptive elements that are used to represent different types of punctuation marks.

A descriptive data element 220 in language-space data 115, 215 can include an identifier 221 and a type 222. An identifier 221 may comprise data indicating a potential use for or further information about a word of the received text with which the descriptive element is associated (e.g., potential uses). A type 222 may comprise data providing further information about the identifier 221.

According to some embodiments, the identifier 221 may be represented as a character string (e.g.,"_Det"_, "_V", "_N", etc.). For example, the character string "_V" associated with the word "test" may indicate that "test" may be used as a verb "V" which follows a text sequence, indicated by the symbol "_". Also, the character string "_N" may indicate that "test" may be used as a noun which follows a text sequence. Accordingly, "test" in the example text 205 can have two possible meanings. Other identifiers 221 in the example include "_Det" which may represent a determiner following a text sequence, "_Pro" which may represent a pronoun following a text sequence, and "_V3sg" which may represent the third person singular form of a verb following a text sequence.

In some implementations, a type 222 in language-space data 115, 215 may be represented as a character string or numeric sequence. In the illustrated example, the string "pos" is used to represent a part of speech, the string "root" is used to represent a root of a verb, the string "tolower" is used to represent a lower-case version of a word, the string "sent_bound" is used to represent a starting or ending point of a sentence, and the string "word" is used to represent a word of received text.

The invention is not limited to only the descriptive elements 220, identifiers 221, and types 222 shown in FIG. 2A. In a language-processing system 100, language-space data 115 can include many more and different descriptive elements 220, identifiers 221, and types 222 than those shown in the example of FIG. 2A. Different character strings or alphanumeric sequences may be used to represent identifiers 221 and types 222 than are used in the illustrated example. For example, "~vb" may be used to represent a verb following a sequence of text. In this regard, virtually any character strings and alphanumeric sequences may be used to represent identifiers 221 and types 222. According to some embodiments, a language-processing system may include any combination of descriptive elements 220, identifiers 221, and types 222 for all the words of a dictionary and all the parts of speech and meanings for which a word may be used, for example.

Figure 2B:
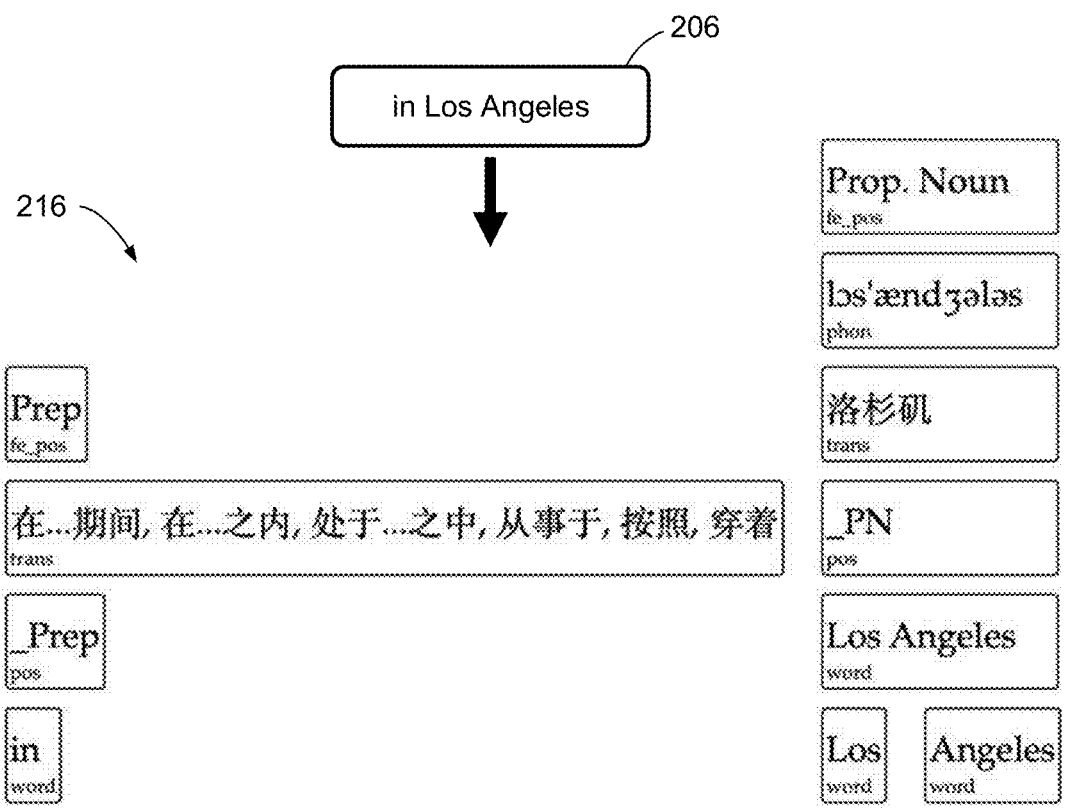
FIG. 2B depicts an example of language-space data that includes foreign language translations, according to some embodiments.

In some implementations, descriptive elements 220 can include translations 224 to one or more foreign languages and phonetic pronunciations 226 of a translation, as illustrated in FIG. 2B. In this example, the received text 206 comprises a prepositional phrase "in Los Angeles." Preprocessor 110 may accordingly produce preposition and proper noun descriptive elements 220 for the language-space data having identifiers 221 "_Prep", "Prep", "_PN", "Prop. Noun".

Figure 3:
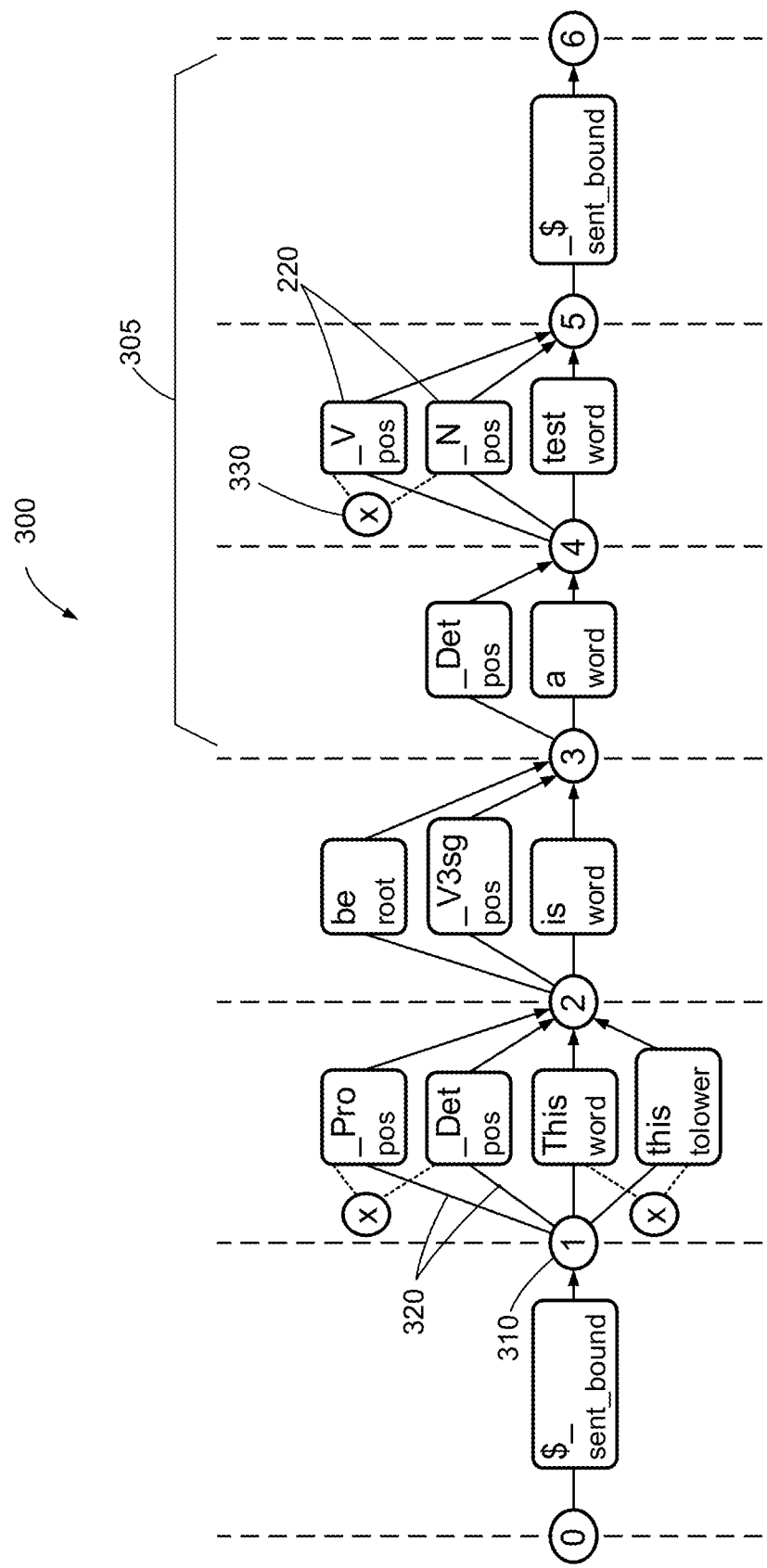
FIG. 3 depicts an example of how language-space data may be represented as an automaton in a language-processing system of the present embodiments.

FIG. 3 depicts a further detailed example of a data structure that may be included in language-space data 115, or constructed from language-space data by virtual machine 130, for example. According to some embodiments, each sentence in received text 205 may be represented in language-space data 115 as an automaton 300. For an automaton 300, the descriptive elements 220 of a sentence are related or linked in a sequence through intervening states 310 (states (0) through (6) in the illustrated example). The sequence may be embodied by associating each descriptive element 220 with a starting state (or position) and ending state (or position). Each descriptive element 220 can then comprise an element lying on a transitional path (also referred to as "transition") 320 between a preceding state and following state, which can be illustrated graphically as in FIG. 3. There can be parallel transitions 320 between two states that include different descriptive elements 220. When the automaton 300 is processed by the language-processing virtual machine 130, the virtual machine determines which transitions 320 of the automaton are correct or have a highest certainty of being correct and retains, in the modified language-space data 135, descriptive elements 220 lying on the correct or most certain transitions. The virtual machine 130 may further determine which transitions 320 are incorrect and exclude from the modified language-space data 135 those descriptive elements 220 lying on incorrect transitions.

According to some implementations, language-space constraints may be placed on one or more descriptive elements 220 for an automaton 300. A language-space constraint may be generated by preprocessor 110 and recorded in language-space data 115. A language-space constraint may be implemented as a flag, tag, or additional data field associated with one or more descriptive elements 220, for example. A language-space constraint may place a restriction on one or more descriptive elements 220 that may be included in modified language-space data 135. In some cases, a language-space constraint may be limited to descriptive elements 220 that are associated with a same word or that are associated with a same prior state and following state.

One example language-space constraint is an exclusivity constraint 330, which is illustrated graphically in FIG. 3. An exclusivity constraint 330 may apply to two or more descriptive elements, for which only one of the identified descriptive elements is permitted to be included in a next or final modified language-space data 135. In the illustrated example, an exclusivity constraint 330 applies to two descriptive elements 220 associated with the word "test". The exclusivity constraint 330 may identify that potential use of "test" in the sentence can either be as a noun or as a verb, but not both.

For explanation purposes and for user display, the language-space data 215, automaton 300, and language-space constraint 330 may be represented as graphical representations, as depicted in the drawings of FIG. 2A through FIG. 3. It will be appreciated that data structures containing relevant information can be associated with and define the language-space data 215, automaton 300, and language-space constraint 330. In terms of a graphical representation, language-space constraints may belong to a graphical representation (or data structure) that differs from a graphical representation or data structure defining an automaton 300. In this regard, descriptive elements 220 can be associated with or be included in more than one graphical representation or data structure. For example, descriptive elements 220 can be part of a language-space graphical representation (or language-space data structure) and part of an automaton graphical representation (or automaton data structure).

Language-space constraints can reduce processing times of automatons, according to some embodiments. For example, when an automaton 300 is processed by the language-processing virtual machine 130, the virtual machine may determine that a descriptive element, to which a language-space constraint applies, is a correct descriptive element (e.g., indicative of a correct meaning of its associated word) that is to be retained in the modified language space 135. The virtual machine 130 may further identify that the descriptive element is subject to an exclusivity language-space constraint. As a result, the virtual machine may not traverse alternative transitions 320 associated with descriptive elements subject to the same exclusivity language-space constraint, and thereby avoid processing time that would otherwise be spent traversing these alternative transitions.

Automatons, such as the example automaton 300 illustrated in FIG. 3, may be processed by the language-processing virtual machine 130 using a finite-state transducer 132-n or bi-machine transducer 134-n. Two lines of source code that may be compiled by compiler 125 into a finite-state transducer are illustrated in FIG. 4A. A representation of a corresponding compiled finite-state transducer 400 is depicted in FIG. 4B.

Referring to FIG. 4A, a first line of source code 401 describes actions to be taken by the language-processing virtual machine 130 when constructing modified language-space data 135 and when encountering a potential noun phrase at an end of a sentence in language-space data 115. A linguist may compose the first line of source code 401, for example, to indicate that a noun phrase in accordance with the first line of source code 401 is linguistically correct. The first line of code 401 includes the symbol "[" signifying an instruction to begin constructing a descriptive data element 220, and includes the symbol "]" signifying an instruction to end construction of the descriptive element for the modified language space 135. The first line of code 401 also includes the string "NP" to identify the constructed descriptive data element as a noun phrase. According to some embodiments, the symbol appearing immediately after the constructor "[" may be used as an identifier 221 for the constructed descriptive element 220, for example. The first line of code 401 may further include one or more identifiers ("_Det", "_N", "_$" in this example) that are tested for a match with identifiers 221 in an automaton 300 sequence. Upon a match of the sequence of identifiers in the code with a sequence of identifiers 221 in an automaton, the instruction(s) in the code (construct a noun-phrase descriptive element) is carried out and is associated with each descriptive element appearing before the end-constructor symbol "]", for example.

A second line of source code 402 also describes actions to be taken by the language-processing virtual machine 130 when constructing modified language-space data 135. A linguist may compose the second line of source code 401, for example, to indicate that a noun phrase having a determiner (e.g., "the" or "a") followed by a word having a verb meaning is linguistically correct. The second line of code 402 differs from the first line in that it includes the identifier "_V" followed by the symbol "-". The latter symbol can indicate, for example, an instruction to delete or exclude a descriptive element 220 having an identifier "_V" that follows a determiner "_Det" when constructing the modified language space 135.

Various expressions for source code are possible and not limited to the illustrated embodiments. Some example expressions and their meanings are listed in Table 1 below.

TABLE 1

Example source code expressions

| Expression | Meaning |
| --- | --- |
| V3sg | verb 3rd person singular |
| Det | determiner |
| Ving | verb progressive form |
| VG | verb group ("has been") |
| VG NHUM | verb group with human subject |
| $ $ | input boundary |
| /! | next block unambiguous |
| A! | block A unambiguous |
| A:! | make A unambiguous |
| [NP | add block <NP> |
| [NP:! | add unambiguous block |
| :[A] | inserts a block |
| (//X | Y) | X and Y span same positions |
| < A~X | > | X is right aligned with A |
| < A | X ~> | X is left aligned with A |
| (~x) | synonyms of x |
| (wiki:type x y) | matching if x y is a wiki entry |

In the example expressions, the symbol "!" is used to identify a descriptive element 220 that is unambiguous or make a descriptive element 220 unambiguous (indicated by the symbol sequence ":!"). Appending "!" to a descriptive element identifier for matching purposes can indicate to the virtual machine 130 that matching is only allowed if the descriptive element has been identified as unambiguous. A flag may be used to identify descriptive elements 220 as unambiguous in some embodiments. The symbol "!" relates to establishing certainty of text processed by the language-processing system 100. Descriptive elements 220 identified as or made unambiguous have a highest level of certainty in terms of text interpretation. Example expressions include some identifying relational aspects of descriptive elements 220 in the generated language space 115 (e.g., spanning same positions, left-aligned, right-aligned, etc.). As noted above, other symbols may be used instead of or in addition to those listed in Table 1. The expressions can comprise identifiers for descriptive elements 220 and expressions that identify operations to be performed when processing language-space data 115.

Figure 5A:
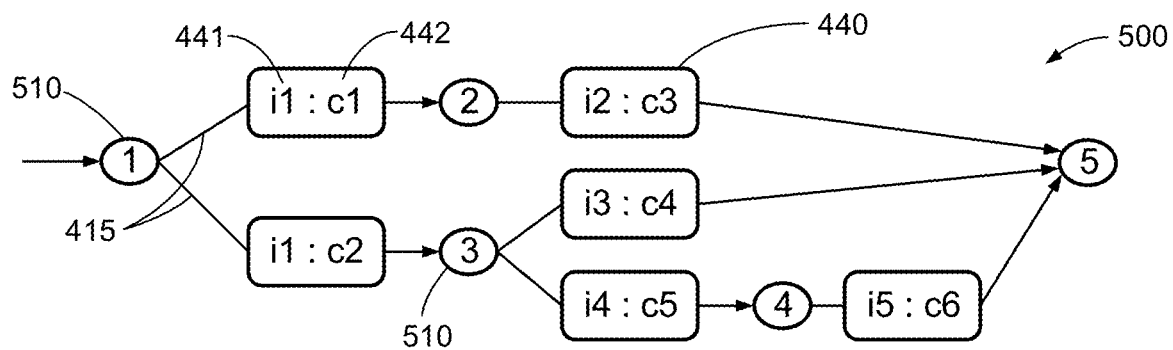
FIG. 5A depicts an example finite-state transducer, according to some embodiments.

FIG. 4B is a representation of a finite-state transducer 420 that may be produced from compilation of the two lines of code in FIG. 4A, according to some embodiments. In this example, a line of instructions is compiled into a sequence of linked binary objects 440 that are associated with prior and following states 430. The sequence of binary objects and states form a finite-state transducer 420. The binary objects 440 may be represented graphically as lying on one or more transitions 415 between states 430. In embodiments, one or more different binary objects may include data associating the binary objects with same prior and ending states within a finite-state transducer. For example, there can be multiple binary objects lying on parallel transitions 415 between the same two states (such as states (1) and (2) in this example). In some implementations, the size of a finite-state transducer 420 can be large and contain many more states 430, transitions 415, and binary objects 440 than those shown in FIG. 4B. Additionally, a finite-state transducer 420 may include branching states. A branching state can include parallel transitions to two or more different states, an example of which is shown in FIG. 5A.

In some embodiments, a binary object 440 of a transducer may include at least two parts: an identifier element 441 and a code element 442. The identifier element 441 may comprise a character string, for example, that potentially matches to one of the plurality of possible identifiers 221 that may appear in descriptive data elements 220 of the language-space data 115 and an automaton 300. In this example, identifier elements 441 include the character strings "_Det", "_N", "_V", and "_$". A code element 442 may include binary code to be executed and/or a pointer to binary code to be executed. The binary code may include a simple instruction, or multiple lines of instructions. In the illustrated example, some code elements are depicted as pseudo-code. In some cases, a code element 444 may be empty and contain no code and no pointer to code to be executed.

At run time, a finite-state transducer 420 or bi-machine transducer is utilized by the language-processing virtual machine 130 to produce a modified language space 135 from the input language space 115. The operation may be referred to as applying a finite-state transducer on a finite-state automaton. In some embodiments, a finite-state transducer can be applied repeatedly on an automaton until all transitions in an automaton have been processed. When a finite-state transducer is applied on an automaton, a detected match between an identifier element 441 in a binary object and an identifier 221 of a descriptive element 220 in the automaton causes the language-processing virtual machine 130 to execute code if identified by the code element 442 in the binary object.

An example of such an operation can be understood in reference to FIG. 3, FIG. 4B, and FIG. 4C. In this example, the finite-state transducer 420 is applied on a portion 305 of the automaton 300 (extending from state 3 to state 6). In a first application of the finite-state transducer 420, a transition between states (0) and (1) of the finite-state transducer 420 may be applied on the transition between states (3) to (4) of the automaton 300 containing the descriptive element 220 with an identifier "_Det". In this transition, the finite-state transducer 420 includes one binary object having an identifier element "_Det" that matches the identifier "_Det" of the descriptive element 220 in the automaton. In response to detecting the match, the virtual machine 130 executes code identified by the code element 442 associated with the identifier element 441 in the binary object 440. In this example, the executed code begins creation of a descriptive element 450 (a noun-phrase descriptive element) for the modified language-space data 465, which is depicted in FIG. 4C. The created descriptive element 450 is given the identifier "NP" and is associated with an "entity" type. An identifier "NP" may be used to indicate a noun phrase. Further, when a match is detected, the virtual machine 130 may retain or write the descriptive element 220 into the modified language space 465. If a match were not detected on the first transition from (0) to (1), then program flow would continue to a next transition without execution of code associated with a code element 442. For example, no change would be made to the modified language space 135.

Between states (1) and (2) of the finite-state transducer 420, there are two possible transitions 415. The virtual machine 130 may apply either one of the two transitions 415 of the finite-state transducer 420 to one of the transitions 320 of the automaton portion 305 first. The order is not important. When applying a transition of the finite-state transducer on the automaton, the virtual machine may search for a match between an identifier element 441 of an object 440 lying on the applied transition to any identifier 221 of a descriptive element 220 existing on any of the transitions lying between the same two states in the automaton (between states (4) and (5) of the automaton in this example).

If the virtual machine 130 first applies the transition 415 including the binary object 440 having the identifier element "_N" of the finite-state transducer 420, then a match will be detected for the transition 320 including the descriptive element having the matching identifier 221 "_N". Accordingly, code corresponding to the code element 442 of the binary object will execute. In this example, the virtual machine will end construction of a descriptive element having the identifier "NP". The virtual machine may further identify the constructed descriptive element 450 for the modified language space 465 as being associated with one or more descriptive elements in the modified language space that result from transitions between states (3) to (5) of the automaton portion 305 (e.g., descriptive elements containing the identifiers "_Det" and "_N" in this example).

In some implementations, the virtual machine 130 may further detect a language-space constraint 330 associated with the matched identifier 221. In such cases, the virtual machine may execute code in accordance with the language-space constraint before applying a next transition of the finite-state transducer on the automaton. For example, the virtual machine 130 may detect a flag associated with the matched identifier 221 that indicates an exclusivity constraint 330 as described above. In response, the virtual machine may delete from the language-space data 115, and automaton 300, alternative descriptive elements 220 and their corresponding transitions 320 identified by the exclusivity constraint 330. In this manner, transitions of the automaton can be removed that would otherwise be processed by the finite-state transducer and thereby reduce overall processing time of the received text.

Referring again to FIG. 3, if the virtual machine 130 first applies the transition 415 including the binary object 440 having the identifier element 441 "_V" on the automaton, then a match will be detected for the transition 320 including the descriptive element 220 having the identifier "_V" of the automaton. In this example, the virtual machine will execute corresponding code to delete or exclude (identified by the "-" symbol in the line of source code 402) from the modified language space 465 the descriptive element 220 having the identifier "_V" that was in the language-space data 115. The virtual machine in this example may further execute additional code identified by the code element 442. In this case, the code may include instructions to end creation of descriptive element on or more conditions (e.g., if the creation of the descriptive element for the language space has not been ended and a match has been found for another parallel transition of the automaton).

In some cases, if an exclusivity constraint 330 is detected for the descriptive element 220 having the identifier "_V" of the automaton, as in this example, the virtual machine 130 may be configured to determine whether the constraint applies to only one other descriptive element 220 on an alternative parallel transition in the automaton 300. If so, the virtual machine 130 may retain or write the other descriptive element to the modified language space and execute its code identified in the corresponding binary object 440 without applying the transition of the finite-state transducer on an additional parallel transition of the automaton. The virtual machine may, in some cases, delete the corresponding descriptive element 220 (e.g., having the identifier "_N") from the language space 115 and automaton.

As may be appreciated from the foregoing description of applying a finite-state transducer 420 on an automaton 300, the operation results in disambiguation of word meanings (e.g., by removal of potential word meanings that do not comply with linguistic constraints) and construction of a modified language space that includes meanings that are in compliance with linguistic constraints and correct in the context of surrounding text. The operation can further add mark-up or metadata (e.g., noun phrases, verb phrases, prepositional phrases, sentence delineation, quotation, etc.) that provides additional information about constituents within a sentence or paragraph.

In some instances, a finite-state transducer may include one or more branching states 510 as shown in an example finite-state transducer 500 depicted in FIG. 5A. Parallel transitions 415 from a branching state terminate on two or more different states rather than terminating on a same state. In some cases, a branching state 510 may be a degenerative branching state, such as state (1) in FIG. 5A. For a degenerative branching state, there are two or more binary objects 440 lying on transitions from the branching state that have identical identifier elements 441. To simplify the drawing, identifier elements 441 are indicated by the character sequence "iN" and code elements are indicated by the character sequence "cN," where N is a number. When a language-processing virtual machine 130 traverses a finite-state transducer 500 that includes a degenerative branching state 510, then the virtual machine may not know which transition 415 is the correct transition to follow, potentially leading to an error condition unless further information is obtained.

A practical example of where a degenerative branching state may occur is in a computer-implemented analysis of "would" appearing in a sentence, such as "I would." When encountering "would," the language-processing virtual machine may not know whether the word is being used as a verb alone (e.g., having a descriptive element identifier "_V") or as an auxiliary verb in a longer verb phrase (e.g., having a descriptive element identifier "VAUX") that may be followed by additional words relating to the predicate of the sentence. Accordingly, code executed in a binary object of a language-processing virtual machine depends upon how "would" is used in the sentence. For example, code to be executed by the virtual machine depends language-space data 115 that follows the transition(s) on which descriptive elements for "would" lie.

Figure 5B:
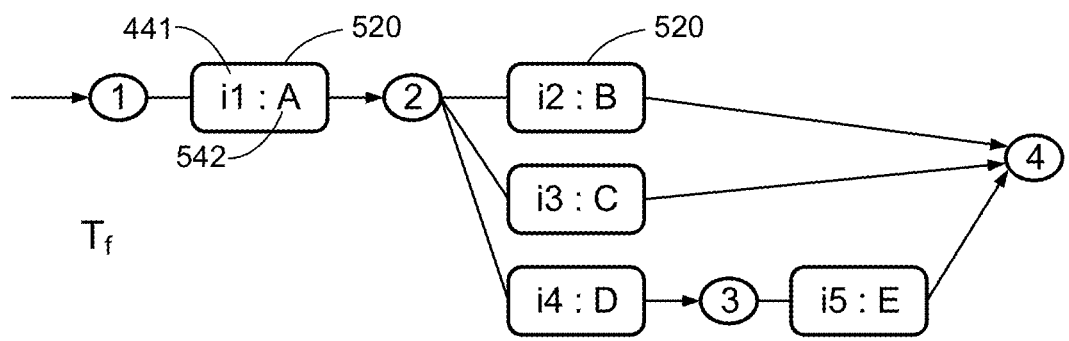
FIG. 5B depicts an example bi-machine transducer, according to some embodiments.
Figure 5B:
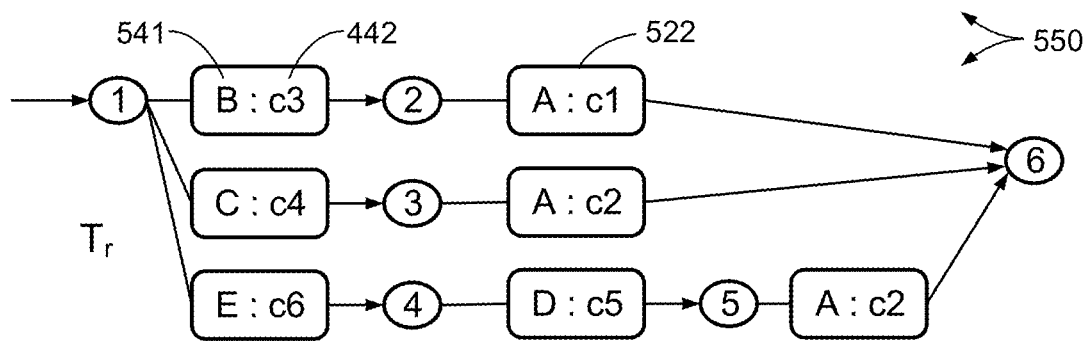

The inventor has recognized and appreciated that bi-machine transducers can remove degenerative branching states and avoid potential run-time or output errors of the language-processing virtual machine 130. FIG. 5B illustrates an example bi-machine transducer 550. A bi-machine transducer 550 may comprise two parts, sometimes referred to as a forward transducer $T_f$ and a reverse transducer $T_r$. Each part includes states and transitions, like the single finite-state transducer 500 shown in FIG. 5A. A bi-machine transducer 550 can be produced from a corresponding single finite-state transducer 500 by a compiler 125, for example.

A forward transducer $T_f$ may include binary objects 520 that include identifier elements 441 that would appear in the single finite-state transducer 500. Instead of including code elements, the binary objects 520 include intermediate identifiers 542 which are used for navigating the reverse transducer $T_r$. The reverse transducer $T_r$ may include binary objects 522 having the intermediated identifiers 542 as matching elements. The binary objects may further include code elements 442 that would appear in the single finite-state transducer 500.

In operation, the forward transducer $T_f$ would be applied on an automaton first and then the reverse transducer $T_r$ would be applied. For example, suppose an automaton includes a sequence of two descriptive elements 220 wherein the first has an identifier "i1" and the second has an identifier "i3". A language-processing virtual machine 130 having only a single finite-state transducer 500 might hang up after state (1) or execute code in an incorrect path, since it may not know which transition 415 is the correct transition to follow. A desired traversal would be from states (1) to (3) to (5), producing the code sequence "c2", "c4".

In contrast, a language-processing virtual machine 130 having a bi-machine transducer 550 has only one option on the forward transducer $T_f$ for a match of the identifier "i1" after state (1), which produces the intermediate identifier "A." Similarly, the only possible match after state (2) produces the intermediate identifier "C." The output from the forward transducer is then the sequence of intermediate identifiers "A", "C".

A language-processing virtual machine 130 may then reverse the order of a sequence of intermediate identifiers produced by application of the forward transducer $T_f$, and used the reversed sequence to navigate the reverse transducer $T_r$. In this example, the reverse sequence of intermediate identifiers "C", "A" identifies, without ambiguity, code elements "c4" and "c2" when traversing the reverse transducer. The language-processing virtual machine 130 may then reverse the order of execution of code segments corresponding to the identified sequence of code elements produced by the reverse transducer $T_r$. In this example, the order of execution of code segments would be code segment(s) associated with "c2" first followed by segment(s) associated with "c4". Referring back to FIG. 5A, it can be seen that an identifier sequence "i1", "i3" would desirably produce execution of code segments corresponding to the code element sequence "c2", "c4".

The bi-machine transducer 550 has no degenerative branching states, so that the virtual machine 130 can process an automaton without ambiguity or error. It can be verified that the bi-machine transducer 550 removes degenerate branching states from a single finite-state transducer 500 and executes a correct sequence of code segments for any sequence of identifiers 221 that would match to identifying elements 441 of the single finite-state transducer 500 and to the identifying elements in a corresponding forward transducer $T_f$.

A language-processing virtual machine 130 can include bi-machine transducers (e.g., to avoid degenerative branching states in a single finite-state transducer). A language-processing virtual machine 130 may also include single finite-state transducers in which there are no degenerative branching states, since in these instances a bi-machine transducer is not needed.

Figure 6:
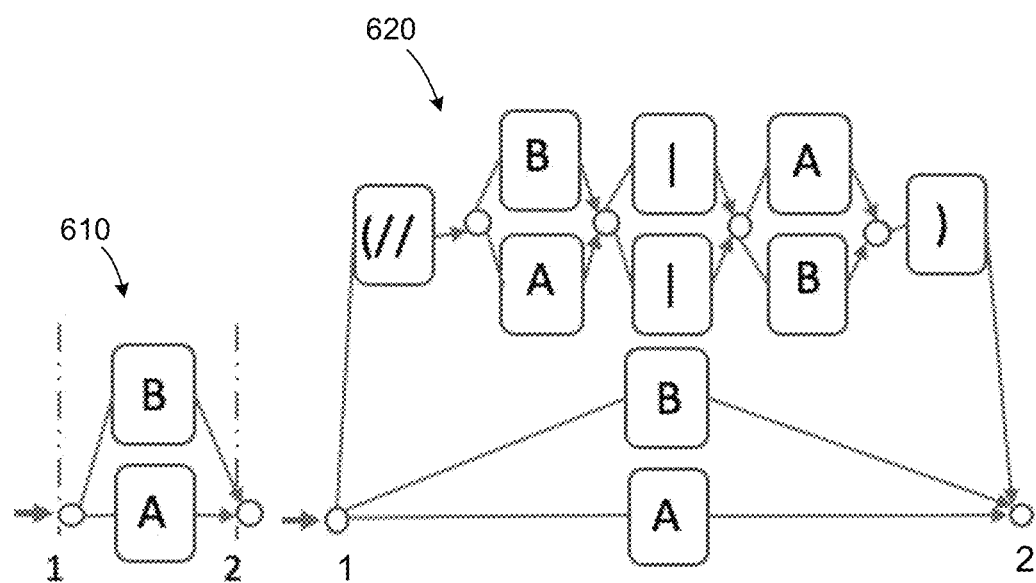
FIG. 6 depicts an expanded portion of an automaton associated with relational aspects of descriptive elements in the language space, according to some embodiments.

The inventor has further recognized and appreciated that some expressions within source code can be complex and difficult or not readily possible for the language-processing virtual machine 130 to handle without some modifications. One such expression is a relational expression ("// A|B") indicating that descriptive elements A and B need to be parallel to each other in an automaton. Accordingly, their starting and ending positions in the language space 115 must be the same. Such a constraint is not part of a finite-state automaton (FSA) produced as described above, and a transducer containing this pattern cannot be applied directly on the FSA. However, the inventor has recognized that is theoretically possible to transform the information stored in the language space 115 into a FSA that will allow application of a transducer containing such relational patterns. An example of such a transformation is depicted in FIG. 6. In this example, a initial portion 610 of an automaton generated from language-space data is regenerated as an expanded portion 620 of the automaton.

The expanded portion 620 of the automaton includes set of valid expressions, with at most one ("// X|Y") sequence, that can be matched by application of a transducer. As depicted, the expanded portion 620 can be potentially appreciably larger in data size than the initial portion 610. Such expansions can incur computational costs when computing on the fly (e.g., during generation of automatons based on received text to be analyzed). Efficient methods for computing expanded portions 620 of automatons are described further below. Although computational costs may be incurred, the expansion of automatons allows source code to be transformed into a single bi-machine transducer, which can then be applied on an automaton generated from language-space data without encountering run-time errors from expressions associated with relational aspects of descriptive elements in the language space. The transducer can is applied until no further modifications to the language space data is observed, which indicates that disambiguation of words in processed text has completed.

The inventor has recognized that generating an expanded portion 620 of an automaton on the fly may or may not be computationally expensive depending on the type of data that the expansion is based on. In general, an expansion may transform one or more objects in language space 115 or an automaton 300 into a state machine (e.g., a finite state automaton), as depicted in FIG. 6. This transformation may be referred to as "statification." According to some embodiments, powerful expressivity can be obtained while using an efficient type of statification: constant-time stratification.

For explanation purposes, statification relating to the relational operator "//" will be described. Examples of other operators that can be statified following similar principles will then be described. For an object O representing a language L(O) over an alphabet $\Sigma$, a statification of O will be called an automaton $A=\Phi(O)$ defined as $A=(\Sigma, Q \subset N^+, i, \varphi, \delta)$ where $\delta: Q \times \Sigma \to 2^Q$ is the on-the-fly transition function and $\varphi: Q \to \{0, 1\}$ the on-the-fly terminal state function. By extension, $\Phi(L(O))=\Phi(O)$.

Given a language space S, <S, //> can denote the set of all valid expressions (as defined by the semantic of (// . . . | . . . )) for that language space. For example, $S=(\Sigma, N, A, \pi)$ where $B \subset \Sigma \times N \times N$ is the set of blocks or descriptive elements (label, start and end position); where A=(Q, i, F, d) is an automaton with d: $Q \times B \to 2^Q$ being the transition function and $\pi: Q \to N$ gives the position of each set on a language space axis (multiple states can share the same position). It can be assumed that $Q \subset N$ and that i=0. We denote by b.s and b.e the starting and ending positions of a descriptive element block b.

Based on the above, one can construct $\Phi(<S, //>)=A_2=(Q_2, i_2, \varphi, \delta)$ where $i_2=(0, 0)$. In the following, it is helpful to consider the second number in each state as the type of this state with 0: match outside (//, 1: just after reading (//, 2: between (// and and having read at least one block, 3: after |, 4: between | and) after having read at least one block.

$\delta((q, 0), b)=\{(q', 0)|q' \in d(q, b)\}$ $\delta((q, 0), (//)=\{(q, 1)\}$ $\delta((q, 1), b)=\{(q', 2, b.s, b.e)|q' \in d(q, b)\}$ $\delta((q, 2, s, e), b)=\{(q', 2, s, b.e)|q' \in d(q, b)\}$ $\delta((q, 2, s, e), |)=\{(q', 3, s, e, q)|\pi(q')=s\}$ $\delta((q, 3, s, e, q''), b)=\{(q'', 4, s, e, q'', b.e)|q' \in d(q, b) \text{ and } b.s=s\}$ $\delta((q, 4, s, e, q'', et), b)=\{(q', 4, s, e, q'', b.e)|q' \in d(q, b)\}$ $\delta((q, 4, s, e, q'', et), ')')=\{(q'', 0)\}$ if e=e'

$\varphi((q, 0))=1$ if $q \in Fs$ and 0 in all other cases

It can be shown that $L(A_2)=<S, //>$. This statification will transform the initial portion 610 of the automaton into an expanded portion 620, as depicted in FIG. 6. Because $\Phi(S)$ can be exponentially bigger than S, it may be beneficial to not compute expanded portions for all of S completely. In some embodiments, transformation may only be used within the T ($\Phi(S)$) or BI($\Phi(S)$) computations. Such a statification can be useful because $\delta$ and $\varphi$ can be computed very efficiently. Further, they can be computed in constant time. When this is possible, it can be said that the original object is statifiable in constant time. In some implementations, it is also statifiable in constant space, because the length of each state (which can be thought of as memory storage at each state) is also bounded by a constant (6 in this example).

Examples of expressions and operators that can be statified are included in Table 2.

TABLE 2

Example expressions that can be stratified

| | Expression | Meaning |
|---|---|---|
| 1 | (~|A|B) | B is right aligned with A: it shares the same ending position |
| 2 | < A ~ B | > | B is right aligned with A and it starts after A |
| 3 | < NP ~ book | > | e.g.: matching a noun phrase with 'book' as head |
| 4 | (| ~ A|B) | B is left aligned with A: it shares the same starting position |
| 5 | <A | B ~> | B is left aligned with A and it ends before A |
| 6 | (X A | B) | A and B overlap ("cross") |
| 7 | (< A | B) | span of A is strictly included in span of B |
| 8 | (> A | B) | span of B is strictly included in span of A |
| 9 | (d5 A | B) | matches if A and B appear less than 5 words apart |
| 10 | (&& A | B) | A and B |
| 11 | (NOT A | B) | A and not B |
| 12 | (~ big) | matches any expression synonym with 'big' |
| 13 | (wiki:person PN PN) | matches any sequence of PN also in wikipedia |
| 14 | (isa animal N) | matches if the noun is an animal (stored taxonomy) |
| 15 | < DATE >, month < 7 > | matches date with month attribute 7 |
| 16 | ( >2 N) | matches if the noun is used at least twice in the input |

The first five lines of Table 2 give examples of other relational operators that can be statified together. Example (3) shows a noun phrase with a left block labeled "book" (referring either to the word itself or to its root). This provides a natural way to identify noun phrase whose head could be a book. The expression of example (5) can be identified to detect verb phrase in a particular mood as in <VP| would have ~>. Example (7) can be used in an expression like (<DATE:-DATE) which simulates longest match (e.g., it removes the shorter DATE if it's included in a longer one). Example (9) is more of a discovery tool: (d6 destroy evidence) would match only if the two words are at most six words apart. Examples (10) and (11) give logical operators that are usually not naturally within finite-state environments, and further indicates some of the possibilities of expressive power with the language-processing system 100 of the described embodiments. Examples (12), (13), and (14) show three examples in which a language space can be augmented with predefined knowledge bases and thesauri. Despite the result that a language space size may be increased substantially due to stratification of operators for these three examples, the statification of such expressions or operators can be as efficient as statification for other operators and expressions in Table 2. Example (15) alludes to a fact not discussed here: attribute-value pairs can be stored in descriptive element blocks and accessed through the same statification process.

Many operators can be used to extract the type of entities and information still difficult to process with conventional systems. For example, an expression (d20 (is a politician (wiki:person FN LN)) | running for re-election) can be used to match a person who has an entry in Wikipedia, is marked as a politician (which could have been derived from Wikipedia as well) and is mentioned at most 20 words from the sequence "running for re-election". The expressive power available with the source code can allow for complex matching criteria.

Aspects of expressive power and establishing certainty with the language-processing system 100 can be understood in connection with the following sequence of source code instructions. This sequence may be applied on an example sentence, "John has been reading this book for a long time."

(1a) [VG has been _Ving:!]_Det
(1b) [ADVP (// for _Prep:!) a (// long _A:!) (// time _ N:!)]_$
(2a) _PN [VG_NHUM:!<VG~:!read |>]
(2b) <VG>[NP _Det _N]<ADVP>
(3a) $_[PERSON:!_PN]<VG_NHUM>!
(3b) <VG>!<NP|:!_Det:!_N:!|><ADVP>
(3c) <VG|! has been ~><NP><ADVP:! for a long time |>
(4a) $_[S_START:!<PERSON>]
(4b) [S <PERSON>!<VG_NHUM>!<NP>]
(5) $_[S <S|:!<PERSON>!<VG|! has been ~><NP>!|><ADVP>!]_$ The inventor postulated that some linguistically motivated expressions that would be near-certain when applied may be derivable by examining a small set of sentences. For example, expressions such as [NP _Det _N] might be avoided, which are too ambiguous. However, expressions too specific to the sentence (too lexical) should also be avoided. As a result, expressions that can be derived from some existing linguistic description (discussed later in this section) may be preferable. Because of the expressive power of the language-processing system, the task of producing linguistically motivated expressions was much easier than expected. Additionally, for the examined sentences, the set of linguistically motivated expressions was usually sufficient to parse the sentences completely.

Because of the unexpected ease of deriving linguistically motivated expressions, it was questioned with parsing is mostly deterministic. If so, then for each sentence a finite (and small) number of deterministic steps may be applied to completely analyze this sentence. Such a result would run entirely counter to existing parsing algorithms, whether symbolic, probabilistic or neuronal. Such sequence of deterministic steps may be referred to as "a certainty pathway." A surprising finding by the inventor is that most sentences, even very long and highly complex ones, can be parsed completely deterministically but that, in some cases, a small level of non-determinicity is still helpful.

For explanation purposes, a simple sentence will be examined to describe how a linguist can approach analyzing such sentences with the expressive power of the source code 120 of language-processing system 100. The example sentence is, "John has been reading this book for a long time." The sequence of expressions (1a)-(5) above can be applied on this example sentence to produce a final modified language space 135 that includes certainty identifiers for descriptive elements 220 in the language space. Application of the sequence of expressions can propagate certainty identifiers through the language space with each successive application of expressions (or corresponding automatons) and modification of the language space.

Figure 7:
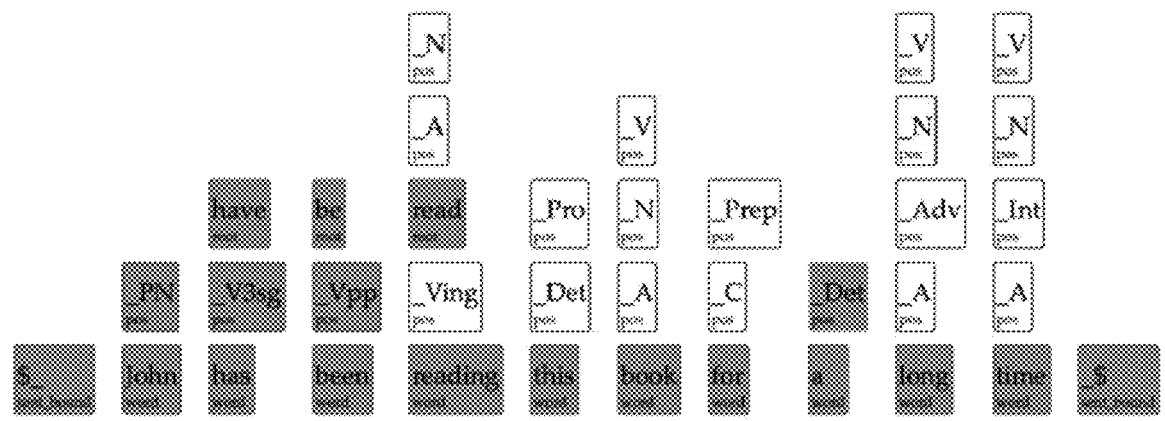
FIG. 7 depicts an example rendering of modified language space data that includes certainty indicators for descriptive elements, according to some embodiments.

As discussed above, all the expressions can be compiled in one single program applied within a loop until no more modifications are made to the language space. For this example, the loop is applied five times and the numbering of lines of code refers to which iteration of the loop the expression within the line is applied. In a first iteration, expressions for (1a) and (1b) are applied. Source code line (1a) indicates that a block of type <VG> (e.g., verb group) is created around "has been reading" and that the progressive form of reading is marked as unambiguous (which means that alternate part-of-speech blocks can be removed from the language space). Source code line (1b) is completely lexical: it recognizes "for a long time" as a possible adverbial phrase and at the same time all part-of-speeches of individual words are marked as unambiguous. The result of this first iteration can be to associate certainty identifiers or tags with the affected descriptive elements 220 in the language space. In a graphical representation such as that shown in FIG. 2A, elements marked as certain may be depicted differently (e.g., colored differently) than other elements not marked as certain, as depicted in FIG. 7 for example.

In source code line (2a), <V~read|> will match "read" if "read" is right-aligned with <VG >. This is an example of a way to express: a verb group whose head is "read". The exclamation mark in the expression <VG~:!read|> indicates that the block <VG> should be marked as unambiguous. The expression is applied only if it is preceded by a proper noun. In addition, a new block labeled <VG NHUM> is created and marked as unambiguous. The expression "VG NHUM" indicates that this verb group can take a human as subject. The information in (2a) can be derived from existing linguistic studies and is not particular or specific to the example sentence.

Source code line (2b) creates a <NP> block according to existing context and internal structure. Source code line (3a) recognizes that "John" refers to a person without ambiguity because it follows the beginning of sentence marker and precedes a verb group that takes NHUM (i.e. a person) as subject. Because <VG> has been marked has unambiguous, source code line (3b) will apply and mark <NP > as well as the internal part-of-speech as unambiguous. Source code line (3c) confirms the adverbial phrase as certain because it recognizes the past-progressive form inside the verb group as well as the noun phrase in between.

Source code line (4a) inserts an optional sentence start marker and line (4b) creates a tentative sentence. Source code line (5) concludes the parsing. For the example sentence, everything is determined by the language-processing system 100 to be unambiguous. It should be noted that expressions can re-use information inside previously analyzed descriptive elements multiple times.

It should be noted that while each step of sentence analysis can be mostly deterministic, the order and the direction (whether right, left, up or down, across trees) of these steps can be unpredictable. The order can be like a treasure hunt in which only instructions to the next place are given; nothing is known about the following steps until the present step is completed and a next set of instructions is received. This is in part due to embedding code portions or identifiers of code portions in transducers as described above.

Such an aspect can be illustrated with the sentence: "He said that whoever left would have to answer for it." The sentence can be processed deterministically using steps listed in Table 3.

TABLE 3

Expressions for processing an example sentence

| 1 | said that: ['$_'] _x |
| 2 | $_ [NP_NHUM_ :! whoever] : [VG_] _ VNHUM |
| 3 | [VG:! would have to _ V] _ Prep |
| 4 | [VG_NHUM :! <VG ~! _VNHUM! > ] |
| 5 | :[_NP_NHUM]! <VG_NHUM ~ answer | > for :[NP_]! |
| 6 | <NP_> [NP:! _Pro] _$ |

TABLE 3-continued

Expressions for processing an example sentence

| 7 | $_ [NP_HUM:! [S:! whoever [VG:! _VNHUM ] ] ] < _NP_NHUM> |
| 8 | $_ [S <NP_HUM>! <VG ~! answer|> for <NP>! ] _$ |
| 9 | $_ [S [NP:! _Pro ] say that <S>! ] _$ |

Source code line (1) introduces the start of sentence marker $_after "that". Source code line (2) recognizes "whoever" as NHUM because of context (including previously added start of sentence). Source code line (3) recognizes "would have to answer" as a verb group (with right context). Source code line (4) marks the fact that the verb group with "answer" takes a NHUM as subject. Source code line (5) introduces an end of NP_NHUM marker before "would" and a beginning of NP marker before "it". Source code line (6) uses the newly added start of NP marker and the right context to recognize "it" as a noun phrase. Source code line (7) uses the start of sentence marker added at (1) and the end of NP_HUM marker added at step (5) to recognize that "whoever left" is a complete sentence that should be considered as an NP_HUM; note that it uses the fact that "whoever" is the subject of the two verbs "left" and "answer for". Source code line (8) uses the just analyzed NP_HUM of "whoever left" to complete the analysis of "whoever left would have to answer to it". Source code line (9) completes analysis.

Figure 8:
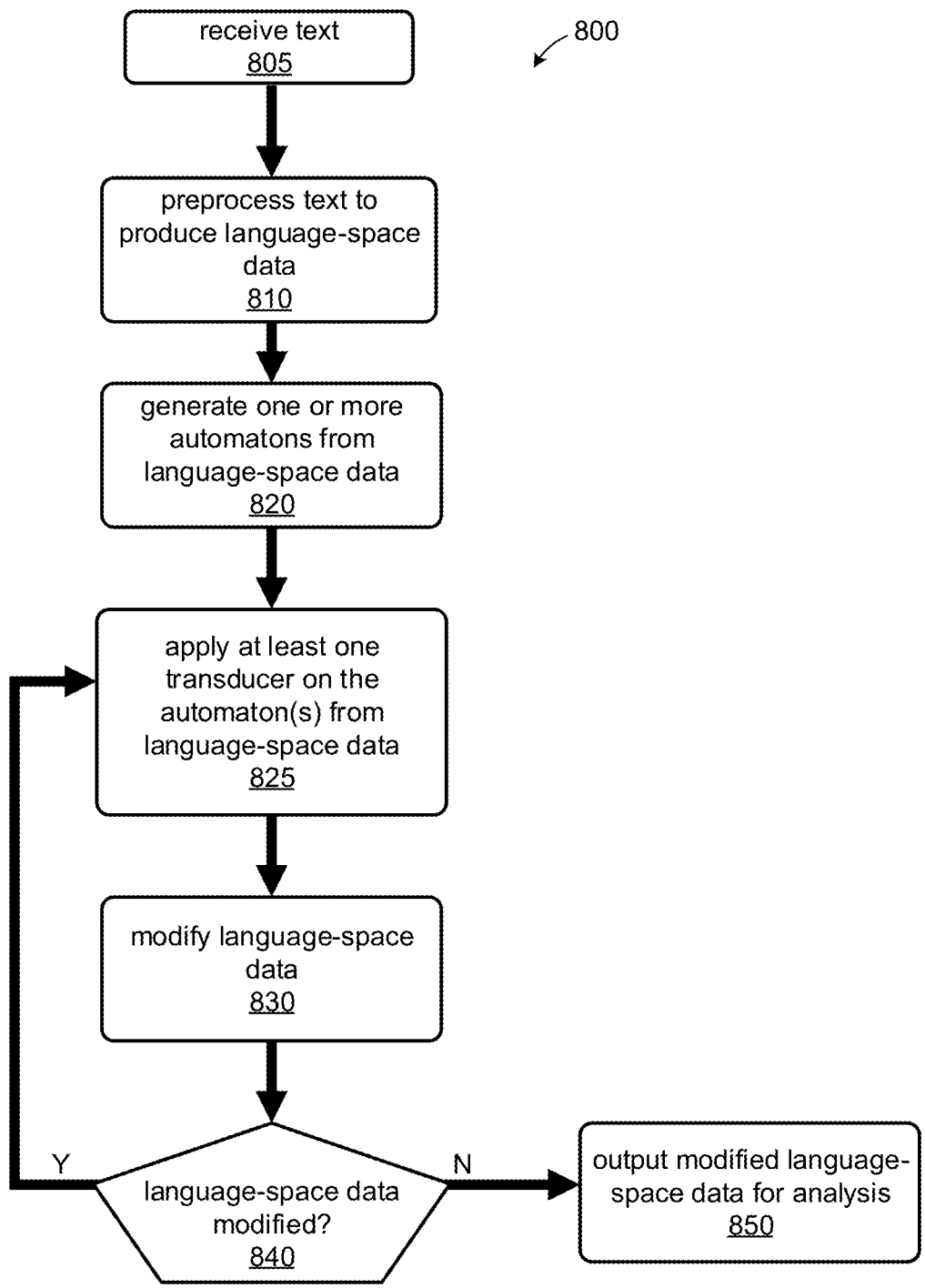
FIG. 8 depicts an example method that may be executed by a language-processing system, according to some embodiments.

Acts of an example method 800 that may be executed by a language-processing system 100 are depicted in FIG. 8. According to some embodiments, a method 800 may begin with receiving (act 805) text that is to be processed and disambiguated by the language-processing system 100. The text may include one or more phrases, sentences, paragraphs, or pages of text. The method may further include preprocessing (act 810) the text to produce language-space data 115, as described above. The method may comprise generating (act 820) one or more automatons from the language-space data. For example, descriptive data elements 220 of the language space data may be linked as a relational data structure representative of a received sentence. A method 800 can further include applying (act 825) a transducer (e.g., a finite state transducer or bi-machine transducer) on the automaton(s). The application of the transducer may identify code segments of the transducer that are executed to modify (act 830) the language space data. The language-processing system may determine (act 840) whether the language-space data has been modified by the application of the transducer. If the language-space data has been modified, the system may return to applying (act 825) the transducer on the automaton(s). If no further modifications to the language-space data are detected, the system may output (act 850) a final modified language-space data for further analysis or use by a user. For example, search queries may be executed on the output modified language-space data to provide more accurate and/or relevant search results.

A language-processing virtual machine 130 that employs language space automatons, finite-state transducers 132-*n*, and bi-machine transducers 134-*n* according to the present embodiments can analyze text significantly faster than conventional approaches. Some conventional approaches may analyze text by codifying linguistic constraints into rules that are stored in look-up tables, searching the tables for a correct rule, and applying the rule on the text directly. When the number of linguistic constraints becomes large (e.g., thousands or tens of thousands of constraints) and sentence length is long (e.g., longer than 12 words), orders of magnitude improvements in analysis speed can be achieved according to the present embodiments. For example, a sentence of about 15 words can be analyzed by a personal computer using the present methods about 100 times faster than the same sentence is analyzed by the Stanford Parser available on-line. The difference in speed is even greater for longer sentences. The increase in speed is due in part to the avoidance of a large number of look-ups when traversing finite-state transducers or bi-machine transducers.

The present embodiments exhibit additional advantages over conventional methods. Because the source code comprises instructions and terms familiar to or quickly understood by linguists, linguists can more easily express precise linguistic constraints that may otherwise would be expressed imprecisely in conventional approaches based on standard computer-programming languages. Because of improved preciseness with which linguistic constraints can be expressed, the present embodiments can process natural language text more accurately than convention natural language processors on many types of input.

Another feature of the present embodiments is that the accuracy with which text is analyzed can be tracked for each sentence. For example, the language-processing virtual machine 130 can determine whether unambiguous matches have been made for at least one identifier 221 at each transition 320 of an automaton having a sequence of descriptive elements for a sentence. According to some embodiments, if unambiguous matches have been made for each transition, the virtual machine 130 may indicate (e.g., with data in the modified language space) that the interpretation of the sentence is 100% accurate. In cases where a match may not be found for at least one transition 320 in a sequence of descriptive elements for a sentence, the virtual machine 130 may indicate (e.g., with data in the modified language space) that the interpretation of the sentence is partially accurate or not known. Indicating that an interpretation of a sentence is not known can be helpful, because it can allow a user to review the sentence and identify instances for which the virtual machine 130 should not be used, or identify where changes are needed to source code 120.

A compiler and runtime environment for a language-processing system 100 of the present embodiments can be implemented, at least in part, as a self-contained C package with its own regex engine, finite-state engine, lexical analyzers, tokenizer, morphological analyzer, parser generator, compilers (three), virtual machine and code optimization module similar to those found in modern compilers. The data may be kept separate from the code as the compiler generates an executable, similar to the way that a Java compiler would generate compiled Java binary code to be run on a virtual machine.

Figure 9:
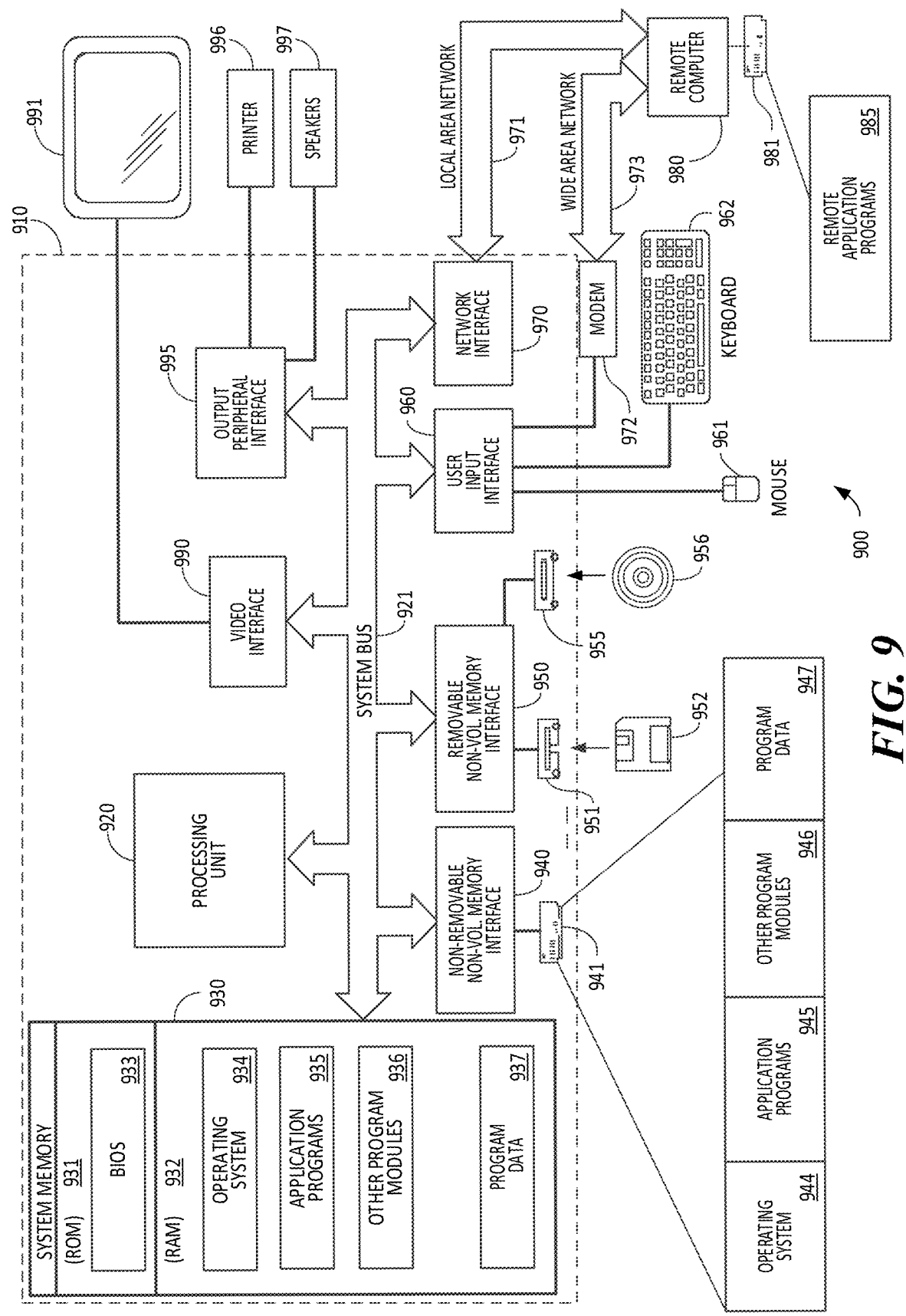
FIG. 9 illustrates an example computing environment that may be adapted to implement a language-processing system of the present embodiments.

FIG. 9 depicts, in further detail, components of a data-processing device that may be included in a device adapted for operation in a language-processing system 100 of the present embodiments. Some or all of the components shown may be present in a language-processing system 100, for example. In a distributed computing environment, some components may be located on a server and some components may be located on a client device. In some embodiments, a device for implementing a language-processing system 100 may include a computing device 910. Components of computing device 910 may include, but are not limited to, a processing unit 920, a memory 930, and a bus 921 that couples various components including the memory to the processing unit 920. The bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 may include one or more types of machine-readable media. Machine-readable media can be any available media that can be accessed by computer 910 and includes both volatile and nonvolatile, manufactured storage media, removable and non-removable manufactured storage media. By way of example, and not limitation, machine-readable media may comprise information such as computer-readable instructions, data structures, program modules or other data. Machine-readable media includes, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information and which can accessed by computer 910.

The memory 930 may include computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, may be stored in ROM 931. RAM 932 may contain data and/or program modules that are immediately accessible to and/or presently being operated on by processing unit 920. By way of example, and not limitation, FIG. 9 illustrates an operating system 934, application programs 935, other program modules 936, and program data 937.

The computer 910 may also include other removable/non-removable, volatile/nonvolatile machine-readable media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile machine-readable media that can be used in the exemplary operating environment include, but are not limited to, magnetic tape cassettes, flash memory cards, digital versatile disks, digital video tape, solid state RAM, solid state ROM, and the like. The hard disk drive 941 may be connected to the system bus 921 through a non-removable memory interface such as interface 940, and magnetic disk drive 951 and optical disk drive 955 may be connected to the system bus 921 by a removable memory interface, such as interface 950.

The drives and their associated machine-readable media discussed above and illustrated in FIG. 9, provide storage of machine-readable instructions, data structures, program modules and other data for the computer 910. In FIG. 9, for example, hard disk drive 941 is illustrated as storing operating system 944, application programs 945, other program modules 946, and program data 947. These components may either be the same as, or different from, operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices may be connected to the processing unit 920 through a user input interface 960 that is coupled to the system bus, but may be connected by other interface and bus structures, such as a parallel port, game port or a universal serial bus (USB). A monitor 991 or other type of display device may also be connected to the system bus 921 via an interface, such as a video interface 990. In addition to the monitor, a computing device 910 may also include other peripheral output devices such as speakers 997 and printer 996, which may be connected through a output peripheral interface 995.

The computer 910 may operate in a networked environment using logical connections to one or more remote devices, such as a remote computer 980. The remote computer 980 may be a personal computer, a server, a router, a network PC, a peer device or other common network node, and may include many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments may be commonplace in offices, enterprise-wide computer networks, intranets and the Internet. Network connections may be wired, optical fiber based, or wireless.

When used in a LAN networking environment, the computer 910 may be connected to the LAN 971 through a network interface or adapter 970. When used in a WAN networking environment, the computer 910 may include a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in a remote memory storage device. By way of example, and not limitation, FIG. 9 illustrates remote application programs 985 as residing on memory device 981. It will be appreciated that the network connections shown are exemplary and other means of establishing a communications link between the computers may be used.

Various configurations of apparatus and methods can be implemented in accordance with the disclosed embodiments. Examples of methods are described in (1) through (14) below.

(1) A method of automated text analysis, the method comprising: receiving text; preprocessing the received text to generate a language space in which one or more descriptive data elements are associated with each word in the received text; and executing an operation with a transducer to process a sentence in the language space, wherein the operation comprises: identifying a match between a first identifying element in the transducer and a first identifier of a first descriptive data element in the language space associated with a word in the sentence; selecting a first code segment that is identified in the transducer to be associated with the first identifying element; and executing the first code segment to produce a modified language space in which the meaning of the word in the sentence associated with the first descriptive data element is disambiguated.

(2) The method of (1), wherein the transducer is a bi-machine transducer.

(3) The method of (1) or (2), further comprising processing the modified language space to extract information from the received text.

(4) The method of any one of (1) through (3), wherein processing the modified language space comprises performing a search query on the modified languages space for all sentences containing words having the meaning of the word.

(5) The method of any one of (1) through (4), further comprising producing a descriptive data element for the word as a data structure that includes an identifier, wherein the identifier is associated with or indicative of a characteristic of the word.

(6) The method of (5), wherein the characteristic is a part of speech for which the word can be used.

(7) The method of any one of (1) through (6), further comprising producing an automaton from plural descriptive data elements for the sentence, wherein the automaton comprises the plural descriptive data elements that are linked in a sequence.

(8) The method of (7), wherein executing the operation comprises applying the transducer on the automaton and traversing transitions of the automaton that include the plural descriptive data elements while simultaneously searching for matches between identifiers of the plural descriptive data elements and identifying elements on transitions of the transducer.

(9) The method of (7) or (8), wherein executing the operation further comprises transforming an object of the automaton into a finite state machine.

(10) The method of any one of (1) through (9), wherein the first identifying element and an identifier for the first code segment are included in a binary object of a finite state transducer.

(11) The method of any one of (1) through (10), wherein the first identifying element is included in a first object for a forward transducer and an identifier for the first code segment is included in a second object of a reverse transducer for a bi-machine transducer.

(12) The method of (11), wherein the act of identifying a match further comprises identifying a match between a first intermediate identifier of the first object and a second intermediate identifier of the second object.

(13) The method of any one of (1) through (12), wherein executing the first code segment comprises: retaining or writing a second descriptive data element in the modified language-space data that is associated with the word; and deleting or excluding a third descriptive data element from the modified language space that indicates an alternative meaning of the word so as to disambiguate a meaning of the word.

(14) The method of any one of (1) through (13), further comprising adding to the modified language-space data a descriptive data element that was not in the language-space data and that provides additional information about the word.

A language-processing system may be embodied in various configurations described in configurations (15) through (22) below. The language-processing system may be adapted with code to execute any of the method embodiments described above.

(15) A language-processing system comprising: at least one processor programmed to implement a language-processing virtual machine that processes automatons produced from natural language sentences and disambiguate meanings of words in the sentences, wherein the automatons comprise sequences of linked descriptive data elements for words of a sentence; and a transducer that is configured to apply on an automaton, wherein the transducer comprises a sequence of linked objects and wherein the objects include code portions that execute in response to a match being identified between a component of an object in the transducer and a component of a descriptive data element.

(16) The language-processing system of configuration (15), wherein the automaton includes parallel transitions between two states in the linked sequence and different descriptive data elements lie on the parallel transitions.

(17) The language-processing system of configuration (15) or (16), wherein the transducer includes parallel transitions between two states in the linked sequence and different objects lie on the parallel transitions.

(18) The language-processing system of any one of configurations (15) through (17), wherein an object includes: an identifying element that potentially matches an identifier in a descriptive data element of an automaton; and a code element that identifies a code portion to be executed in response to the language-processing virtual machine detecting a match between the identifying element and an identifier in a descriptive data element of an automaton.

(19) The language-processing system of any one of configurations (15) through (18), further comprising a bi-machine transducer that includes a forward transducer and reverse transducer, wherein the forward and reverse transducers comprise sequences of linked objects.

(20) The language-processing system of configuration (19), wherein an object of the forward transducer comprises: an identifying element that potentially matches an identifier in a descriptive data element of an automaton; and an intermediate identifier that potentially matches to an intermediate identifier of an object in the reverse transducer.

(21) The language-processing system of configuration (19) or (20), wherein an object of the reverse transducer comprises: a first intermediate identifier that potentially matches to a second intermediate identifier of an object in the forward transducer; and a code element that identifies a code portion to be executed in response to the language-processing virtual machine detecting a match between the first intermediate identifier and the second intermediate identifier.

(22) The language-processing system of any one of configurations (19) through (21), wherein for any potential matching sequence of identifiers from a corresponding sequence of the descriptive data elements there is only one unique path through the bi-machine transducer.

The inventive aspects of a language-processing system may be implemented at least in part with computer-readable medium having code that can be executed by at least one processor. For example, aspects of method any configurations described above may be implemented as code stored on a computer-readable medium. An example computer-readable medium configuration is described below.

(23) Computer-readable medium encoding instructions that, when executed by at least one processor, adapt the at least one processor to: receive text; preprocess the received text to generate a language space in which one or more descriptive data elements are associated with each word in the received text; and execute an operation with a transducer to process a sentence in the language space, wherein the operation comprises: identifying a match between a first identifying element in the transducer and a first identifier of a first descriptive data element in the language space associated with a word in the sentence; selecting a first code segment that is identified in the transducer to be associated with the first identifying element; and executing the first code segment to produce a modified language space in which the meaning of the word in the sentence associated with the first descriptive data element is disambiguated.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method of automated text analysis performed by at least one processor, the method comprising:
receiving text by the at least one processor;
preprocessing, by the at least one processor, the received text to generate a plurality of descriptive data elements that are associated with words in the received text, the plurality of descriptive data elements being descriptive of parts of speech of the words and forming a language space for the received text, wherein multiple descriptive data elements of the plurality of descriptive data element are associated simultaneously with a first word in a sentence of the received text; and
executing, by a language-processing virtual machine that operates on the at least one processor, an operation with a first finite state transducer to process the sentence and increase or decrease a number of the multiple descriptive data elements associated simultaneously with the first word, wherein:
the language-processing virtual machine comprises at least one finite state transducer that includes the first finite state transducer and at least one bi-machine transducer compiled from source code that comprises linguistic constraints,
the first finite state transducer comprises a first plurality of binary objects, and a first binary object of the first plurality of binary objects comprises a first identifying element and a first code segment or pointer to the first code segment associated with the first identifying element,
a first bi-machine transducer of the at least one bi-machine transducer comprises:
a forward transducer comprising a second plurality of binary objects; and a reverse transducer comprising a third plurality of binary objects, wherein:
   a first binary object of the second plurality of binary objects comprises a first intermediate identifier to match to a second intermediate identifier of a first binary object of the third plurality of binary objects, and
   a second object of the first binary object of the third plurality of binary objects comprises a second code segment or pointer to the second code segment, and
the operation comprises:
   identifying a match between the first identifying element in the first binary object of the first plurality of binary objects of the first finite state transducer and a first identifier of a first descriptive data element among the multiple descriptive data elements in the language space associated with the first word in the sentence; and
   executing the first code segment to:
      increase or decrease the number of the multiple descriptive data elements associated simultaneously with the first word, and
      produce a modified language space in which a meaning of the first word in the sentence associated with the first descriptive data element is disambiguated.

2. The method of claim 1, further comprising processing the modified language space to extract information from the received text.

3. The method of claim 2, wherein processing the modified language space comprises performing a search query on the modified language space for all sentences containing words having the meaning of the first word.

4. The method of claim 1, further comprising producing the first descriptive data element for the first word as a data structure that includes the first identifier, wherein the first identifier is associated with or indicative of a characteristic of the first word.

5. The method of claim 4, wherein the characteristic is a part of speech for which the first word can be used.

6. The method of claim 1, further comprising producing an automaton from plural descriptive data elements generated for the sentence, wherein the automaton comprises the plural descriptive data elements that are linked in a sequence.

7. The method of claim 6, wherein executing the operation comprises applying the first finite state transducer on the automaton and traversing transitions of the automaton that include the plural descriptive data elements while simultaneously searching for matches between identifiers of the plural descriptive data elements and identifying elements on transitions of the first finite state transducer.

8. The method of claim 6, wherein executing the operation further comprises transforming an object of the automaton into a finite state machine.

9. The method of claim 1, wherein executing the first code segment comprises:
   retaining or writing a second descriptive data element in the modified language space that is associated with the first word; and
   deleting or excluding a third descriptive data element from the modified language space that is associated with the first word and that indicates an alternative meaning of the first word so as to disambiguate the meaning of the first word.

10. The method of claim 1, wherein executing the first code segment comprises adding to the modified language space, in addition to the multiple descriptive data elements, a second descriptive data element associated with the first word that was not in the language space and that provides additional information about the first word.

11. Non-transitory computer-readable medium encoding instructions that, when executed by at least one processor, adapt the at least one processor to:
   receive text, by the at least one processor;
   preprocess, by the at least one processor, the received text to generate a plurality of descriptive data elements that are associated with words in the received text, the plurality of descriptive data elements being descriptive of parts of speech of the words and forming a language space for the received text, wherein multiple descriptive data elements of the plurality of descriptive data elements are associated simultaneously with a first word in a sentence of the received text; and
   execute, by a language-processing virtual machine that operates on the at least one processor, an operation with a first finite state transducer to process the sentence and increase or decrease a number of the multiple descriptive data elements associated simultaneously with the first word, wherein:
the language-processing virtual machine comprises at least one finite state transducer that includes the first finite state transducer and at least one bi-machine transducer compiled from source code that comprises linguistic constraints,
the first finite state transducer of the at least one finite state transducer comprises a first plurality of binary objects, and a first binary object of the first plurality of binary objects comprise a first identifying element and a first code segment associated with the first identifying element,
a first bi-machine transducer of the at least one bi-machine transducer comprises:
a forward transducer comprising a second plurality of binary objects; and
a reverse transducer comprising a third plurality of binary objects, wherein:
   a first binary object of the second plurality of binary objects comprises a first intermediate identifier to match to a second intermediate identifier of a first binary object of the third plurality of binary objects, and
   a second object of the first binary object of the third plurality of binary objects comprises a second code segment, and
the operation comprises:
identifying a match between the first identifying element in the first binary object of the first plurality of binary objects of the first finite state transducer and a first identifier of a first descriptive data element among the multiple descriptive data elements in the language space associated with the first word in the sentence; and
executing the first code segment to increase or decrease the number of the multiple descriptive data elements associated simultaneously with the first word and produce a modified language space in which a meaning of the first word in the sentence associated with the first descriptive data element is disambiguated.

12. The non-transitory computer-readable medium of claim 11, further encoding instructions that, when executed by the at least one processor, adapt the at least one processor to:

process the modified language space to extract information from the received text by performing a search query on the modified language space for all sentences containing words having the meaning of the first word.

13. The non-transitory computer-readable medium of claim 11, further encoding instructions that, when executed by the at least one processor, adapt the at least one processor to:
produce the first descriptive data element for the first word as a data structure that includes the first identifier, wherein the first identifier is associated with or indicative of a characteristic of the first word.

14. The non-transitory computer-readable medium of claim 11, further encoding instructions that, when executed by the at least one processor, adapt the at least one processor to:
produce an automaton from plural descriptive data elements generated for the sentence, wherein the automaton comprises the plural descriptive data elements that are linked in a sequence; and
apply the transducer on the automaton and traverse transitions of the automaton that include the plural descriptive data elements while simultaneously searching for matches between identifiers of the plural descriptive data elements and identifying elements on transitions of the transducer.

15. The non-transitory computer-readable medium of claim 11, wherein executing the first code segment comprises:
retaining or writing a second descriptive data element in the modified language space that is associated with the first word; and
deleting or excluding a third descriptive data element from the modified language space that is associated with the first word and that indicates an alternative meaning of the first word so as to disambiguate the meaning of the first word.

16. The non-transitory computer-readable medium of claim 11, wherein executing the first code segment comprises adding to the modified language space, in addition to the multiple descriptive data elements, a second descriptive data element associated with the first word that was not in the language space and that provides additional information about the first word.

* * * * *